United States Patent
Green et al.

(10) Patent No.: US 11,883,747 B2
(45) Date of Patent: *Jan. 30, 2024

(54) FHS: SMARTER CONTACT SELECTORS

(71) Applicant: KING.COM LIMITED, St. Julians (MT)

(72) Inventors: Todd Green, Greater London (GB); Tatia Engelmore, Greater London (GB)

(73) Assignee: KING.COM LTD., St. Julians (MT)

( * ) Notice: Subject to any disclaimer, the term of this patent is extended or adjusted under 35 U.S.C. 154(b) by 0 days.

This patent is subject to a terminal disclaimer.

(21) Appl. No.: 17/461,877

(22) Filed: Aug. 30, 2021

(65) Prior Publication Data
US 2021/0387095 A1 Dec. 16, 2021

Related U.S. Application Data

(63) Continuation of application No. 16/589,682, filed on Oct. 1, 2019, now Pat. No. 11,103,789, which is a (Continued)

(30) Foreign Application Priority Data

Mar. 12, 2013 (GB) ..................................... 1304442
Mar. 12, 2013 (GB) ..................................... 1304444
Feb. 13, 2014 (GB) ..................................... 1403084

(51) Int. Cl.
*A63F 13/70* (2014.01)
*G07F 17/32* (2006.01)

(52) U.S. Cl.
CPC .......... *A63F 13/70* (2014.09); *G07F 17/3232* (2013.01); *G07F 17/3274* (2013.01)

(58) Field of Classification Search
CPC ... A63F 13/70; G07F 17/3274; G07F 17/3232
See application file for complete search history.

(56) References Cited

U.S. PATENT DOCUMENTS 5,704,837 A   1/1998  Watanabe et al.
6,093,104 A   7/2000  Kasahara et al.
(Continued)

FOREIGN PATENT DOCUMENTS

WO   WO 2010/096784 A1   8/2010
WO   WO 2011/011466 A1   1/2011
WO   WO 2011/139716      11/2011

OTHER PUBLICATIONS

"Bubble Pandy", JustOnlineGames; retrieved from the Internet: URL: http://www.justonlinegames.com/games/bubble-pandy.html; retrieved on Sep. 9, 2017, 2011, 1-2.
(Continued)

*Primary Examiner* — David L Lewis
*Assistant Examiner* — Robert E Mosser
(74) *Attorney, Agent, or Firm* — Saul Ewing LLP

(57) ABSTRACT

The invention relates to a computer implemented method of controlling a display on a first computer device connected via a communication network to a plurality of other computer devices, the method comprising: receiving user inputs from the first and other computer devices during interaction with a game rendered on the display of each computer device, the game being played by users of the computer devices over the communication network; storing the user inputs in computer storage and generating user behaviour data based on the user inputs; accessing computer storage holding a plurality of contact identifiers of the users and controlling the display of the first computer device to display only a selected set of the stored contact identifiers, wherein the set of contact identifiers is selected to be displayed based on the user behaviour data.

14 Claims, 15 Drawing Sheets

Related U.S. Application Data continuation of application No. 14/206,626, filed on Mar. 12, 2014, now Pat. No. 10,576,367.

(60) Provisional application No. 61/811,019, filed on Apr. 11, 2013.

(56) References Cited

U.S. PATENT DOCUMENTS

| | | | |
|---|---|---|---|
| 8,021,220 | B2 | 9/2011 | Sakamoto et al. |
| 8,075,391 | B2 | 12/2011 | Rommerdahl et al. |
| 8,221,238 | B1 | 7/2012 | Shaw et al. |
| 8,790,168 | B1 | 7/2014 | Wolters et al. |
| 2003/0119581 | A1 | 6/2003 | Cannon et al. |
| 2005/0054446 | A1 | 3/2005 | Kammler et al. |
| 2006/0121971 | A1 | 6/2006 | Slomiany et al. |
| 2006/0121990 | A1 | 6/2006 | O'Kelley et al. |
| 2006/0135264 | A1 | 6/2006 | Shaw et al. |
| 2008/0153570 | A1 | 6/2008 | Esses et al. |
| 2009/0075738 | A1 | 3/2009 | Pearce et al. |
| 2009/0275412 | A1 | 11/2009 | Green et al. |
| 2010/0125632 | A1 | 5/2010 | Leonard et al. |
| 2010/0216553 | A1 | 8/2010 | Chudley et al. |
| 2010/0227675 | A1 | 9/2010 | Luxton et al. |
| 2011/0218045 | A1 | 9/2011 | Williams et al. |
| 2011/0312409 | A1 | 12/2011 | Vancura et al. |
| 2012/0077580 | A1 | 3/2012 | Mahajan et al. |
| 2012/0184362 | A1 | 7/2012 | Barclay et al. |
| 2012/0184823 | A1 | 7/2012 | Chen et al. |
| 2012/0191606 | A1 | 7/2012 | Milne et al. |
| 2013/0316836 | A1 | 11/2013 | Vogel et al. |
| 2013/0331162 | A1 | 12/2013 | Krivicich et al. |
| 2014/0115144 | A1 | 4/2014 | Guest et al. |

OTHER PUBLICATIONS

"Bubble Shooter", Richard's Game Reviews; retrieved from the Internet: URL: http://richardsgamereviews.blogspot.com/2011/03/bubble-shooter.html; retrieved on Sep. 9, 2017, Mar. 19, 2011, 1-2.

"Bubblegum Bridge", https://candycrush.fancom.com/wiki/Bugglegum_Bridge, May 2012.

"Bursting Balls", Retrieved from the Internet: http://www.y8.com/games/Bursting_Balls; retrieved on Sep. 9, 2017, pp. 2-3 of 10, Mar. 15, 2010.

"Liquorice Swirls", https://candycrush.fandom.com/wiki/Liquorice_Swirl, May 2012.

Anonymous ,"Bubble Witch Saga—GameSpot", XP055109245, retrieved from the Internet: URL:http://www.gamespot.com/bubble-witch-saga/ [retrieved on Mar. 21, 2014], Jul. 31, 2012, pp. 1-2.

Anonymous , "Daily Bonus Level Oct. 17, 2012: Bubble Witch Saga Fan Site", retrieved from the Internet: URL: http://bubble-witch-saga.se/daily-bonus-level-17-oct-2012/ [retrieved on Mar. 21, 2014] XP 055109244, Oct. 17, 2012, pp. 1-2.

Anonymous , "Facebook Platform—Wikipedia, the free encyclopedia", XP055109249, retrieved from the Internet: URL:http://en.wikipedia.org/w/index.php?title=Facebook_Platform&oldid=533105335 [retrieved on Mar. 21, 2014], Jan. 14, 2013, pp. 1-4.

Anonymous , "Facebook Spiel Candy Crush Saga: Cheats, Tipps, News and Videos BILDspielt", retrieved from the Internet: URL: http://www.bildspielt.de/social-games/3-gewinnt/candy-crush-saga-180643/ [retrieved on Oct. 25, 2013] XP055085339, Apr. 12, 2012, pp. 1-10.

Anonymous , "King.com expands to Google+ with Bubble Witch Saga", XP055109246, retrieved from the Internet: URL:http://www.insidesocialgames.com/2012/01/24/king-com-expands-tog--goe-withbubble-witch-saga/ [retrieved on Mar. 21, 2014], Jan. 24, 2012, pp. 1-12.

Anonymous , "King.com Skill Games for iPhone and Facebook: http://www.ubergizmo.com/2009/07/king-com-skill-games-for-iphone-and-facebook/", XP055085351, retrieved form the Internet: URL: http://www.google.de/imgres?client=firefox-a&hs=0gJ&sa=X&rls=org.mozilla:en-GB:official&biw=1680&bih=858&tbm=isch&tbnid=Dp0hnHVKMxtoUM:&imgrefurl=http://www.ubergizmo.com/2009/07/king-com-skill-games-for-ip, Jul. 13, 2009, pp. 1-2.

Anonymous , "Why King.com's Candy Crush ios crushing it on Facebook", retrieved from the Internet: URL: http://blog.games.com/2012/05/01/why-king-coms-candy-crush-is-crushing-it-on-facebook, [retrieved on Oct. 25, 2013] XP055085338, May 1, 2012, pp. 1-4.

Collins , "Will Collins Game Spotlight: Candy Crush Saga", retrieved from the Internet: URL: https??developers.facebook.com/blog/post/2012/06/15/game-spotlight-candy-crush-saga/ [retrieved on Oct. 25, 2013] XP055085345, Jun. 15, 2012, pp. 1-2.

Webster, A. , "Bubble Witch Saga Review", Retrieved from the Internet: URL: http://www.gamezebo.com/2011/09/22/bubble-witch-saga-review/; retrieved on Sep. 11, 2017, Sep. 22, 2011, 1-3.

FHS: SMARTER CONTACT SELECTORS

CROSS-REFERENCE TO RELATED APPLICATIONS

This application is a continuation of U.S. application Ser. No. 16/589,682, filed on Oct. 1, 2019, which is a continuation of U.S. application Ser. No. 14/206,626, filed on Mar. 12, 2014, which is based on, and claims priority to, GB Application No. 1304442.5, filed Mar. 12, 2013; GB Application No. 1304444.1, filed Mar. 12, 2013; U.S. Provisional Application No. 61/811,019, filed Apr. 11, 2013; and GB Application No. 1403084.5, filed Feb. 13, 2014, the entire contents of each of which being fully incorporated herein by reference.

FIELD OF THE INVENTION

The invention relates to optimising the usage of a display in a user interface.

BACKGROUND

There are many challenges facing designers of computer applications, one of which is to make maximum use of display resources of a screen that is used to display the application. This is particularly the case where the screen area may be limited, for example on a smartphone, tablet, or other mobile computing device.

This problem can be particularly marked in the context of computer games, where a screen may have to display many different game components for active engagement by a player. Many computer games are now played through a network where users may interact with one another in various ways, such as sending messages or invitations, or transferring game-related data. A contact is another player of the game who the current player may wish to interact with. Contacts' details, e.g. their names, are displayed on the screen and a user can select from the displayed contacts. Users may typically have many contacts with whom they may choose to interact with and, due to the limited size of the screen on which the application is displayed, only some these contacts may appear as options to be selected at any one time. One method that is used to determine which contacts appear on the screen as options, is for a processor to select a group of users at random from the full list of a user's contacts.

It is the aim of the present invention to improve management of display resources by a more focused selection of a user's contacts that are displayed.

SUMMARY

According to an aspect, there is provided a computer implemented method of controlling a display on a first computer device connected via a communication network to a plurality of other computer devices, the method comprises receiving user inputs from the first and other computer devices during interaction with a game rendered on the display of each computer device, the game being played by users of the computer devices over the communication network; storing the user inputs in computer storage and generating user behaviour data based on the user inputs; accessing computer storage holding a plurality of contact identifiers of the users and controlling the display of the first computer device to display only a selected set of the stored contact identifiers, wherein the set of contact identifiers is selected to be displayed based on the user behaviour data.

Another aspect of the invention provides a computer device comprising a network interface for receiving user inputs from a plurality of computer devices connected via a communication network; a processor configured to generate user behaviour data based on the user inputs; computer storage holding a plurality of contact identifiers of the users; wherein the processor is configured to transmit a selected set of the contact identifiers to one or more of the computer devices for display at said one or more computer device, the selected set based on the user behaviour data.

The user behaviour data can be determined to indicate the likelihood of the user leaving the game. The selected contact identifiers can be of users most likely to leave the game. This is sometimes referred to herein as "likelihood of churn".

The likelihood of churn can be indicated by identifying the progress of a user in the game, for example, in a multilevel game by indicating the number levels of a game which have been completed by a user.

Another way of indicating likelihood of churn is identifying the time lapse between user's inputs on a computer device. The time lapse can be determined by time stamps associated with each user input.

Another aspect of the invention provides a computer implemented method of determining criteria to predict whether or not a player is likely to leave a game, being executed on a computer device. The method comprises using a set of criteria to control the display of contact identifiers of users playing a game at respective computer devices connected via a communication network, wherein each selected contact identifier is associated with a selectable icon for allowing a user of the computer device to interact with users at other computer devices via the displayed selectable icon associated with the contact identifier; monitoring the effect of displaying the contact identifiers by determining which users leave the game; and comparing data relating to the set of criteria and data regarding players permanently leaving the game to determine which criteria or combination of criteria provide the best prediction of whether or not the player is likely to leave the game.

Some or all of the one or more time stamps may be recorded when the user accesses the game application.

Some or all of the one or more time stamps may be recorded when the user stops running the game application.

Some or all of the one or more time stamps may be recorded when the user disconnects from a server running the game application.

Some or all of the one or more time stamps may be recorded when the user accesses a user account associated with the game application.

Some or all of the one or more time stamps may be recorded when the user logs out of a user account associated with the game application.

The data regarding aspects of user behaviour may comprise which levels in a game have been completed by each user.

The data regarding aspects of user behaviour may comprise how many gifts or invitations each user has received.

The data regarding aspects of user behaviour may comprise how many contacts each user has, and/or the number of mutual contacts shared between users.

The list of a user's contacts can constitute a selection to the user as to who to send lives to.

The list of a user's contacts can constitute a selection to the user as to who to send extra moves to.

The list of a user's contacts can constitute a selection to the user as to who to send an item that enhances the gameplay of a game and that supports assists, or increases power or effectiveness.

The list of a user's contacts can constitute a selection to the user as to who to send invitations to.

The above can be achieved by associating each displayed contact with a selectable icon for allowing the user of the computer device to interact with the content of the displayed selected set.

BRIEF DESCRIPTION OF THE DRAWINGS

To understand some embodiments, reference will now be made by way of example only to the accompanying drawings, in which.

DETAILED DESCRIPTION OF SOME EMBODIMENTS

An embodiment of the invention in a computer-implemented casual social game is here described. Casual social games are typically implemented through a social networking site where users may interact with one another in various ways, such as sending in-game items, such as lives or moves, offering other types of assistance, or sending invitations. Such social interaction is one way of making the game more enjoyable and thus improving player retention.

The terms user and player are used interchangeably throughout this document and no specific meaning is intended using one or the other unless the context suggests otherwise. The terms contact and friend are also used interchangeably throughout this document and no specific meaning is intended using one or the other unless the context suggests otherwise. A person skilled in the art will realise that the different approaches to implementing the game are not exhaustive, what is described herein are certain preferred embodiments. It is possible to implement the invention in a number of variations without departing from its spirit or scope.

Figure 1:
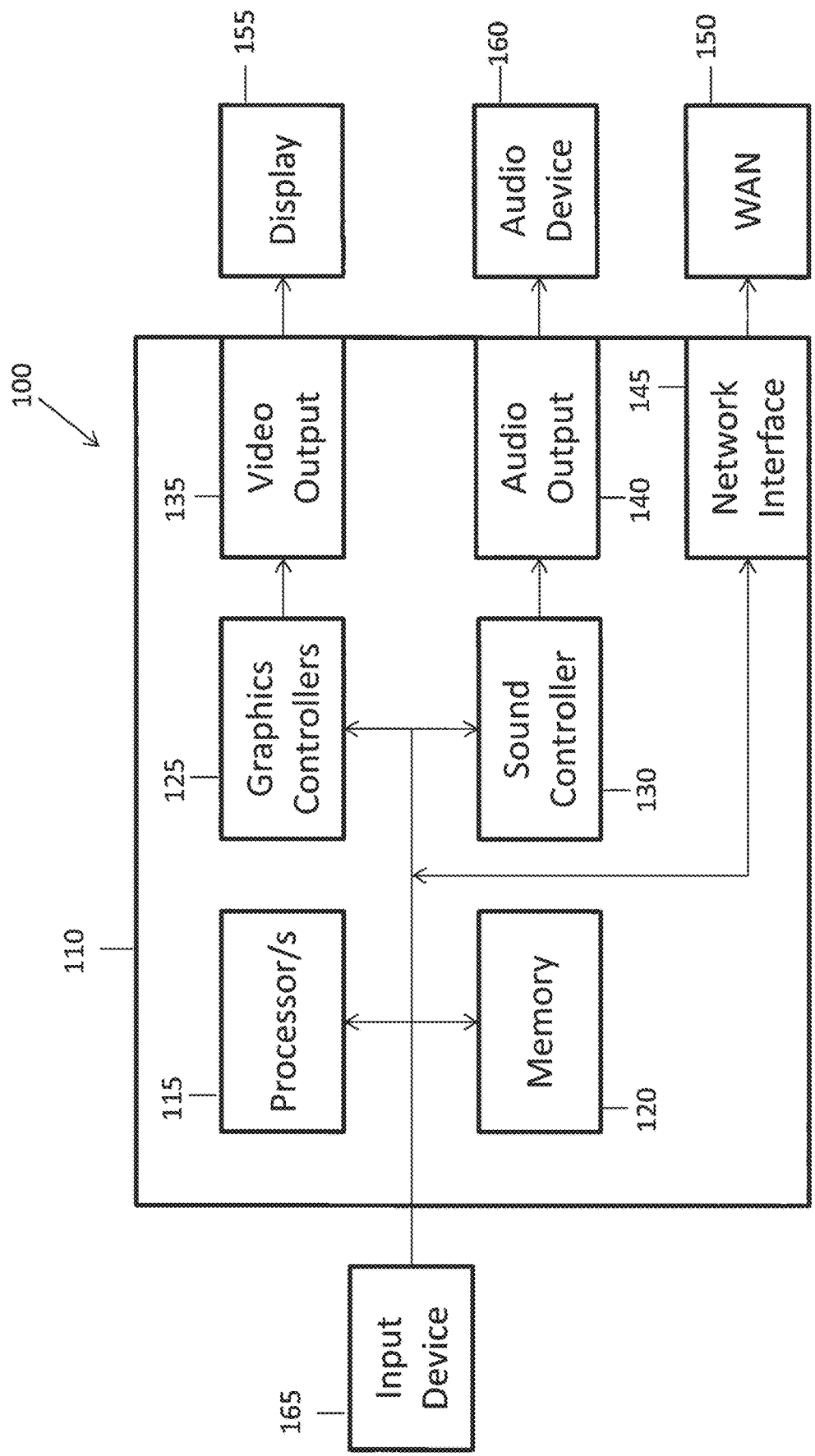
FIG. 1 shows an example user device in which some embodiments may be provided.

A schematic view of a user device 100 according to an embodiment is shown in FIG. 1. All of the blocks shown are implemented by suitable circuitry. The blocks may be implemented in hardware and/or software. The user device may have a control part 110. The control part 110 has one or more processors 115 and one or more memories 120. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio output 140 is provided to an audio device 160 such as a speaker and/or earphone(s).

The device 100 has an input device 165. The input device 165 can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller 110 may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
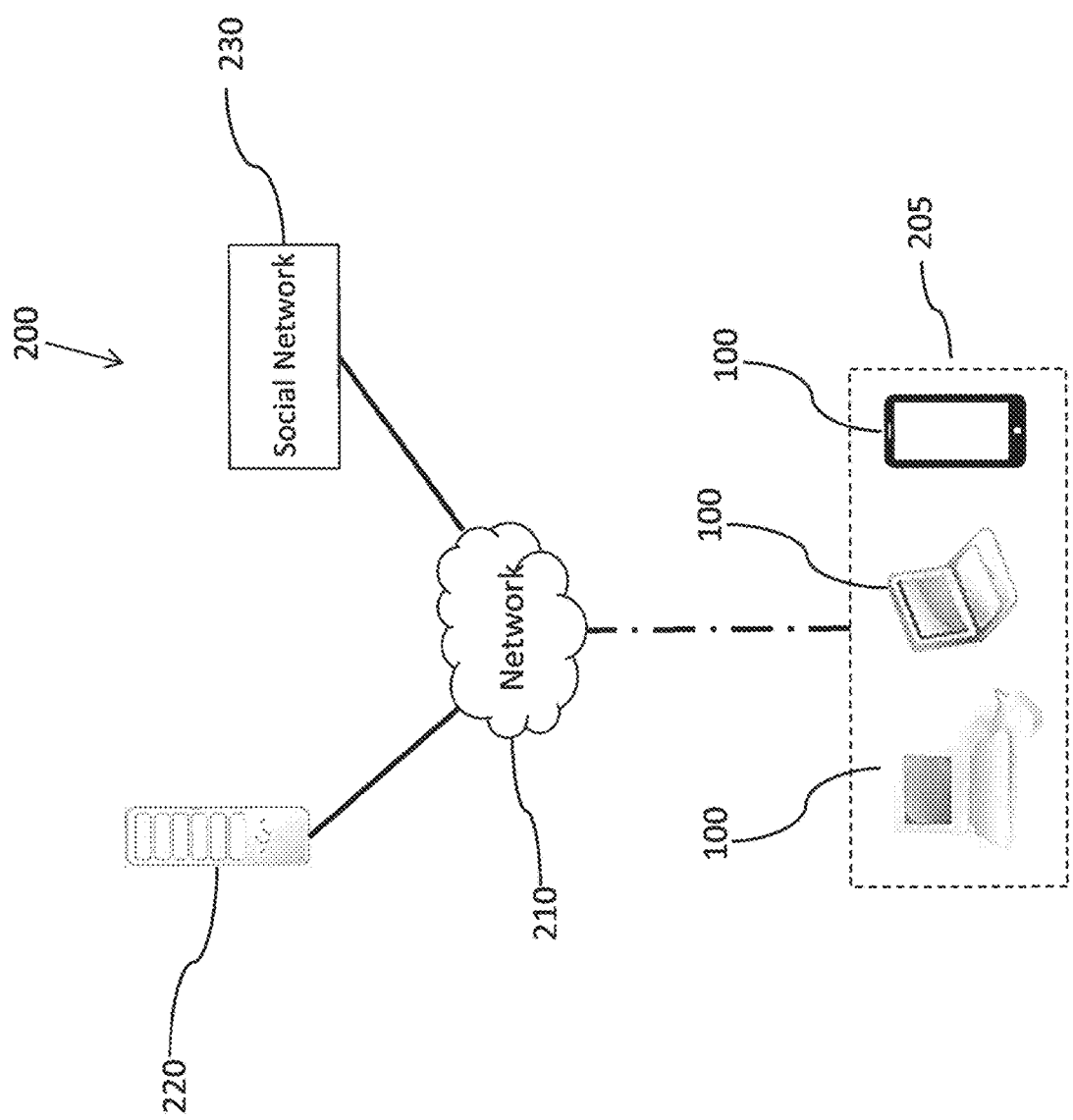
FIG. 2 shows an example system in which some embodiments may be provided.

FIG. 2 schematically shows a system 200 in some embodiments. The system 200 comprises a server 220 which may store databases of game player's details, profiles, statistics, etc. In practice, one or more databases may be provided. Where more than one server is provided, the database(s) may be provided in one database or across two or more servers. The server may also have a games data function. This may comprise one or more units of memory to store the computer game program and user behaviour data, and a processor to run the games program and process the user behaviour data.

The server may communicate via for instance the internet 210 to one or more user devices 205 and may further provide connections to a social network 230 such as Facebook™.

It should be appreciated that embodiments may be deployed in different system architectures. For example, the computer game may be implemented as a computer game that is stored in the memory 120 of the user device 100 and is run on the processor 115 of the user device 100. However, the server 220 may handle some elements of the game in some embodiments. By way of example only, a Java game applet may be provided to the user device 100 and the locally running Java applet will generate, for example, the graphics, sounds, and user interaction for the game play on the user device 100. Some data may be fed back to the server 220 to allow interaction with other players. The data which is fed back may also allow scoring and/or cross platform synchronization.

In some embodiments, the game may be implemented as a computer program that is stored in a memory of the system, for example the server 220, and which runs on a processor of the game server. Data streams or updates are supplied to the user device 100 to allow the user device 100 to render and display graphics and sounds in a browser of the user device 100. Such an approach is sometimes referred to as a web services approach. It should be appreciated, however, that such an approach does not necessarily require the use of the Internet.

One aspect of some social casual games that increases the viralisation and engagement of players is the ability to send in-game gifts or invitations to their contacts.

One type of in-game gift that a player may send to one of their contacts is a life. Lives are necessary to play the game; i.e. if a player's number of lives is zero, the player will not be allowed to play any of the levels of the game. The player loses a life each time he fails a level. Lives may automatically be replenished over time. For example, the player may gain one life every 30 minutes, up to a maximum number of allowed lives, e.g. 5. Alternatively, the player may receive lives from a contact rather than wait. These lives may be received upon request or on the initiative of the sending player. Sending a life to a contact may not cost anything, i.e. the sending player may not lose a life themselves.

Another type of in-game gift that a player may send to one of their contacts is a set of extra moves. In some games, a player has a limited number of moves that may be made on any given level. If this number falls to zero, the player fails the level. Extra moves may be received from contacts or may be purchased. Sending extra moves to a contact may or may not cost anything but may be free for both the player asking for lives and the person sending a life.

Another type of in-game gift that a player may send to one of their contacts is a booster. A booster is an item that enhances the gameplay and that supports assists, or increases power or effectiveness. For example, one booster may increase the frequency with which positive game events occur, another may temporarily increase a score multiplier. Sending boosters to a contact may or may not cost anything, i.e. the sending player may or may not lose a life themselves.

Apart from sending gifts to one another, players may send invitations to their contacts to play against them in head to head tournaments. Players may also send requests for help to their contacts.

Apart from sending gifts or invitations to one another, players may send requests for help to their friends. For example, a player may encounter a level or other scenario that can only be overcome through co-operation from friends. Alternatively, the user may have run out of lives and may choose to request lives from her friends.

It should be appreciated that the invention is not limited to one particular form of communication between players, e.g. sending lives, but may be implemented in any circumstances where a player chooses a selection of their contacts from a list.

Figure 3:
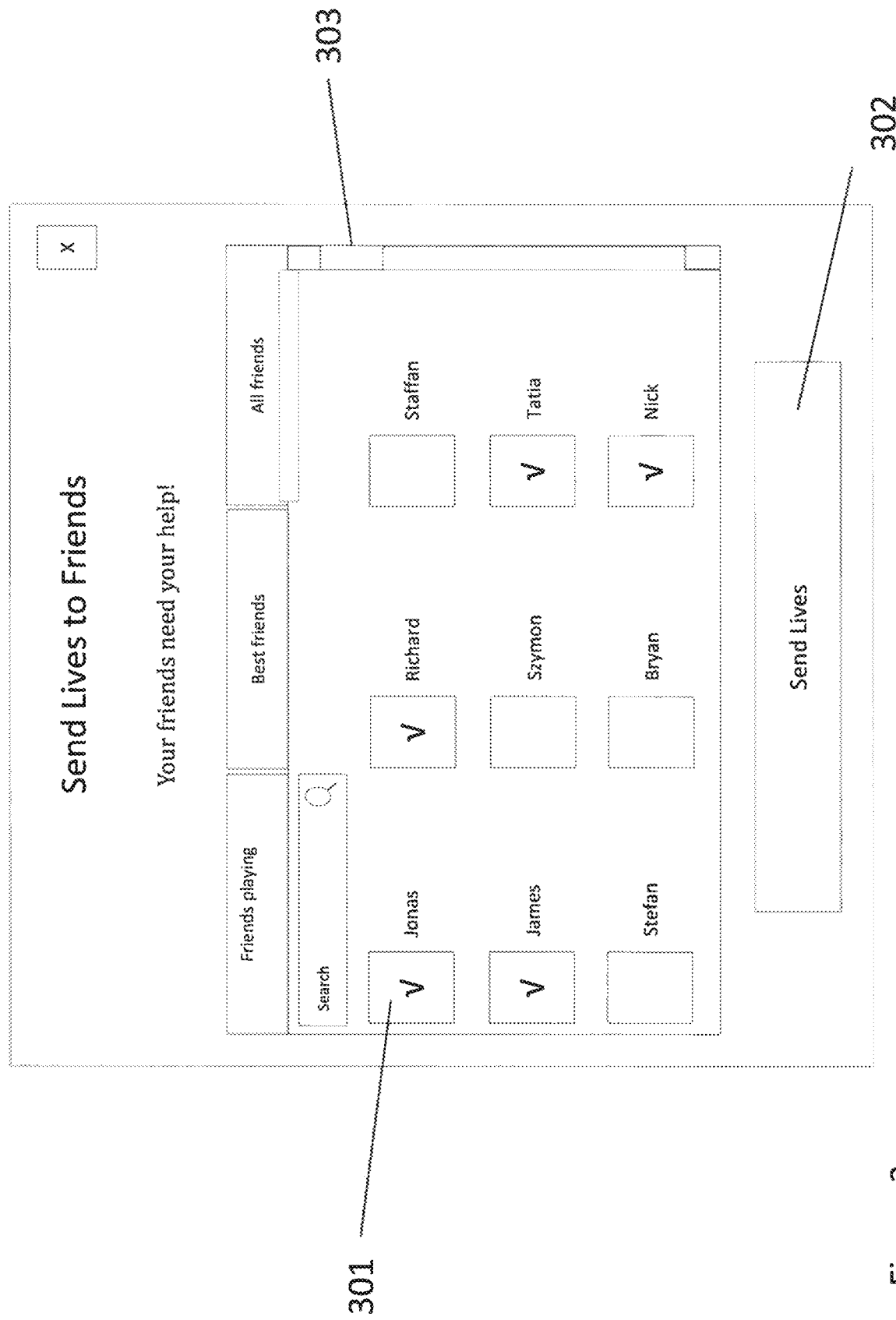
FIG. 3 shows one example of a possible window containing a scrollable list of a user's contacts with the option to send lives to some or all of them.

Reference is made to FIG. 3 which shows an example embodiment of a window where the user may select which contacts to send lives to. Such a window may be accessed by clicking on a tab on the game menu or by other means. Next to each of the user's contact's names are checkboxes 301. The user selects all of the checkboxes next to the contacts to whom she wishes to send lives. The send lives button 302 at the bottom of the window is then clicked to send the lives to all of those players. Not all of the player's contacts are visible in the window at any one time. Instead the window possesses a scroll bar 303 which may be used to navigate the full list.

Figure 4:
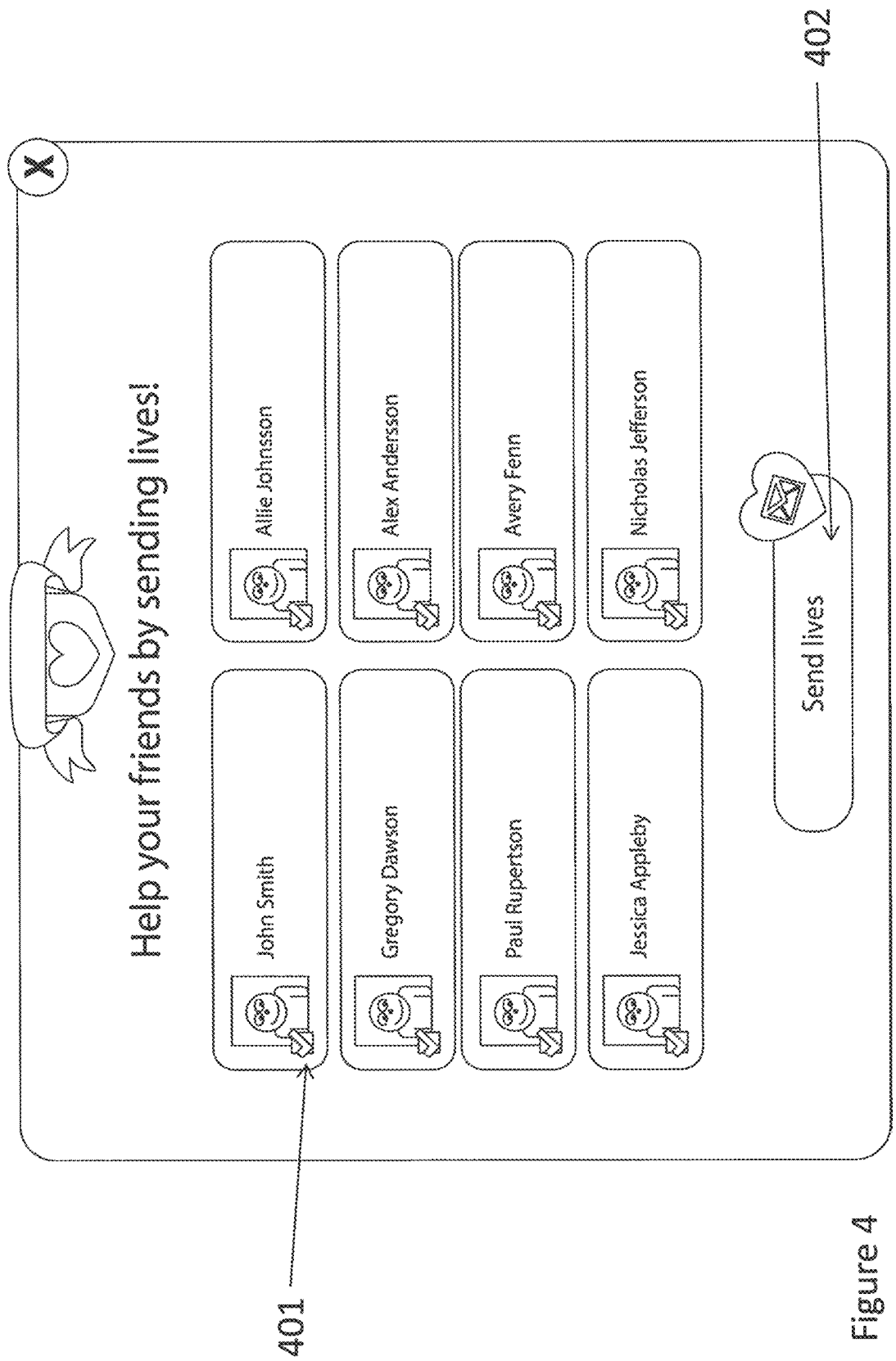
FIG. 4 shows one example of a possible window containing eight of the user's contacts with the option to send lives to some or all of them.

Reference is made to FIG. 4, which shows an alternative embodiment of a window where the user may select which contacts to send lives to. There are check boxes 401 next to each of the user's contact's names and a send lives button 402, both having the same functions as in FIG. 3. In this embodiment there is no scroll bar, with all of the contacts that lives may be sent to being displayed on the screen in one instant.

When a user wishes to send gifts to some of their friends, one method that is used to determine which contacts appear on the screen as options is for a processor to select a group of players at random from the full list of a player's friends. This is, however, less than optimum at retaining players, since certain players may be more likely to stop playing the game than others and, therefore, there is more to gain by encouraging them to stay by encouraging their friends to interact with them.

In one embodiment, the invention may be used to improve player retention by modifying the management of the display resources so as to prioritise those players who are determined by the collected data to be most likely to leave the game.

Over the course of players playing the game, data regarding player behaviour can be collected by a server. This can be the server which provides the game or a separate server. This data can then be used to determine a priority ranking for each player based upon how likely each player is to leave the game. Those players that are judged from the collected data to have a high probability of leaving the game are assigned a high priority ranking, whereas those with a low probability of leaving are assigned a low priority ranking. The priority rankings are then used optimise the content and/or order of a list of a player's contacts when that player opts to send in-game gifts or invitations. Players with a high priority ranking are more likely to appear on the list and at the top of the list.

As an example only, a criterion used to determine the likelihood of "churn" may be the time since the player last played the game. The server may obtain such information by regularly obtaining time stamps whenever certain actions are performed by a user. For example, the game may be accessed by a user logging in through a web browser. A time stamp may then be produced and sent to the server whenever the user logs out, or closes the web browser, hence providing an indication, as to when the user last played the game.

As another example, a criterion used to determine the likelihood of "churn" may be the furthest level that a player has reached within a game. As described earlier, some games have different levels, with the levels generally increasing in difficulty as the player progresses through the game. Players who have progressed less well during a game are more likely (generally speaking) to leave the game than those who have performed better.

These criteria (time since last play/level reached) are particularly useful, as this data is available to a client device.

In one embodiment, a user may be considered to be permanently churned if they have not played the game for a certain period of time, e.g. 30 days. In this case that user's priority ranking may decrease so that other players, who may stand a greater chance of being receptive to interaction from their contacts, are prioritised instead.

Players may be considered "likely to churn" if they have not played the game in the last 8 to 30 days.

Other factors which may indicate how engaged a user is with a game include how many gifts or invitations a user has received, how many contacts a user has, and the number of mutual contacts shared between users.

In one embodiment, as shown in FIG. 3, all of a player's contacts may be displayed in a single list. The order of appearance of players in this list may be at least partially determined by the priority ranking.

In an alternative embodiment, as shown in FIG. 4, there may be a maximum number of contacts that are displayed in the list, in this case eight. Some of the contacts that appear in this list may be chosen on the basis of their priority rankings and some of the contacts that appear may be chosen at random. Alternatively, all of the contacts that appear in the list may be chosen on the basis of their priority rankings. For example the default may be to show as many players that are likely to churn as possible in the list.

Figure 5:
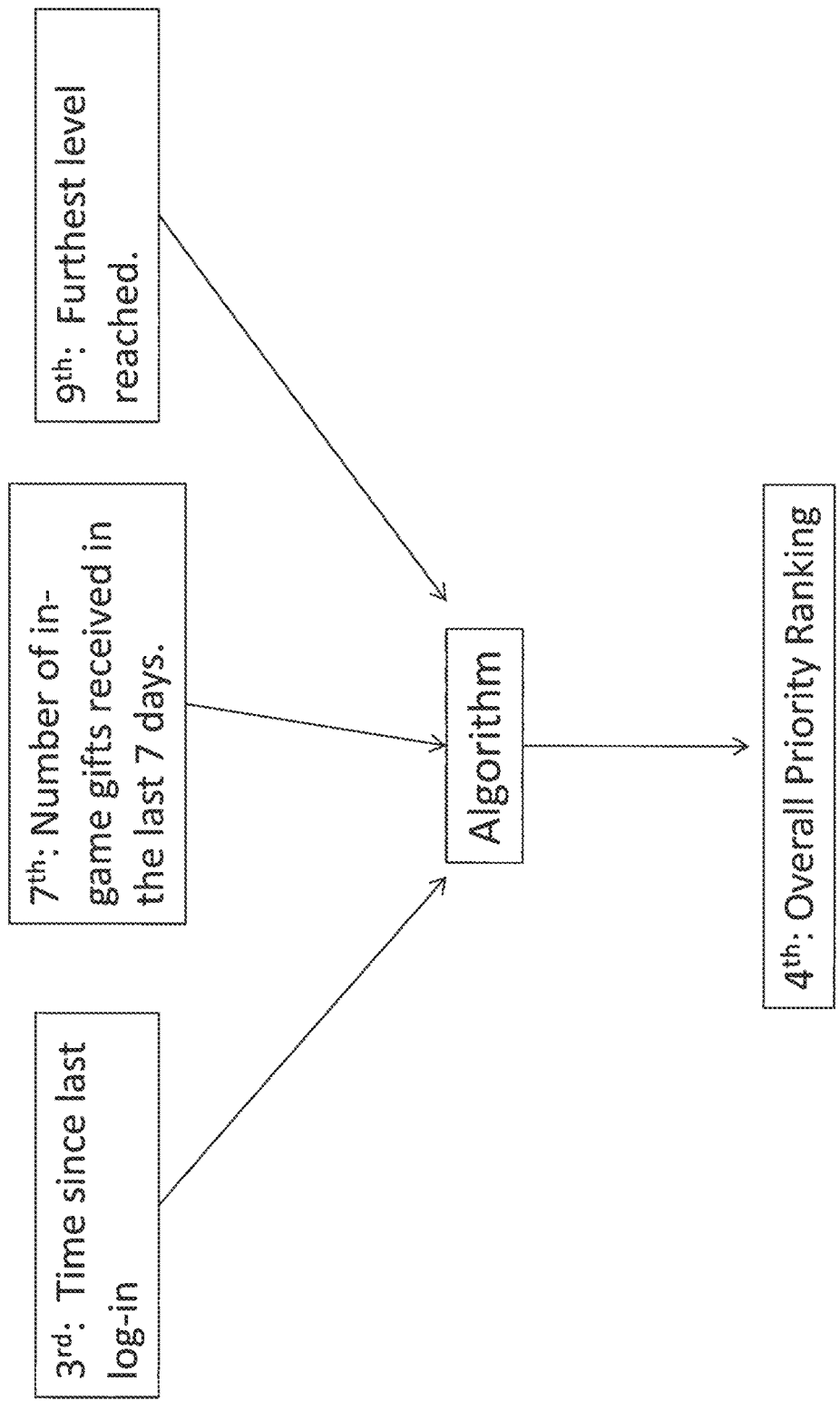
FIG. 5 shows example criteria and values that may be used to determine the overall priority ranking for one of a user's contacts.

Reference is made to FIG. 5, which shows how different criteria may be used to determine the overall priority ranking of one of a player's contacts. Certain attributes are shown, each with its own rank, where the rank for each attribute gives the value that would be assigned as the overall priority ranking were that attribute the only one that was taken into consideration. For example, the player is ranked 3rd in the criterion 'time since last log-in', meaning that the time since they last logged in is the third longest out of all of the player's contacts. As another example, the player is ranked 9th in the criterion 'Furthest level reached', meaning that they have the 9th lowest level progression in the game. The different criteria can be assigned different weights by the algorithm and used to determine the overall priority of the player. In this case the player's overall priority ranking is 4th.

In one embodiment, players will always appear in the list when selecting who to invite, or send in-game gifts to, according to the priority in which they have been ranked. For example, a player ranked 4th will always appear 4th, a player ranked 5th will always appear 5th and so on.

In another embodiment, the list will always display a selection of the user's contacts that have high priority rankings, with any other contacts that are displayed being chosen at random from the player's remaining contacts. For example, a list may display 8 players in total, with 4 of those displayed being selected at random from amongst those players with the top 10 priority rankings, and the other 4 being chosen at random from the player's remaining contacts. Thus, the number of players that are likely to churn that are displayed in the list may be capped. Whilst a cap of 4 likely to churn players is described this is merely an example.

In one embodiment, a set of rules is used to govern the frequency with which players that are likely to churn are displayed in the list. The rules may comprise capping the number of interactions that a player can receive within a given time period, e.g. no more than two per day. Thus, players will be less likely to appear in a list if they have recently received a certain number of interactions from their contacts. This will prevent certain players from appearing in the lists too often, so as to prevent them from receiving too many interactions and other players receiving too few. It should be appreciated that the invention is not limited to prioritising players that are likely to churn, but that such an arrangement constitutes just one embodiment. In another embodiment, the criteria used to determine the order in which the listed friends appear may be if they have paid for something in the game. Within that group players may be more highly ranked if they have spent more money within a specific time period. Another criteria may be that the listed friends have been active in the game within a certain time period or with a certain activity level. Another criteria may be that the listed friends are ranked based on how many total game invites they have received to date, highest first. Yet another criterion may be that players are prioritised if they have already churned, the intention being to reactivate them and bring them back to the game.

These criteria could be combined, in particular in one embodiment any criteria could be combined with criteria indicative of the likelihood of a player leaving the game.

Friends may be prioritised in the following way:
1. Paying players within the game company's network, in order of CLV (customer life-time value) (highest CLV first), then in order of the invites received to date for the current game (highest first)
2. Non-paying players within the game company's network, in order of CLV (if CLV is >$x; highest CLV first), then in order of invites received to date in the current game (highest first)
3. Non-users of the game company's network (in order of invites received to date in the current game, highest first)

Ideally, this list should be easy to reorganise. E.g. in month 1 the focus might be on virality, so the players known to be viral could be prioritised, but in month 2 the focus may be on monetisation, so the players who spend a lot would be prioritised.

Prompting invitees may be stopped at some point so that they are not being spammed. For instance, invitees who have received >10 invites should no longer appear in the list.

Customising Friend Selection Pop-Ups

Friend selector pop-ups may be customized according to two factors: (1) the user who sees them, and (2) the current priorities of the game environment where it has been implemented.

For example: in the 'Send moves' pop-up the user's friends can be arranged according to their spend, and so only friends with the highest spend appear in the pop-up.

Compared with a standard implementation for showing popups which show all friends, there are several reasons for customizing. One particular advantage is to optimise the use of a limited screen area where only a limited number of friends can be displayed. Other reasons include:

Increase spend (e.g. prioritise friends with high spend/CLV)
Increase retention (e.g. prioritise inactive friends)
Increase requests sent (e.g. prioritise viral friends)
Increase CTR on notifications by improving targeting (e.g. by increasing relevance to recipient)

All these give the game developer an additional tool to optimise performance of a game.

The players may be ranked according to a set of measures. For example:

Likelihood of leaving the game (as detailed above).
Spend (for example how much has this player spent on in-game items over a period of time)
Virality (for instance how active is this player in responding to notifications, help requests and other in-game viral effects)
Activity (for instance how active this player is in playing the game; when did the player last play or how many levels has the player played)

These may also be combined—e.g. to reactivate lapsed spenders, the send moves pop-up could display each user's friends in order of spend, but display only users who have been inactive for 10+ days.

Examples of Implementation in a System

There are many possible approaches. Customisation could be approached on a game-specific basis, using only information relating to a single game (e.g. the game could customise pop-ups using only the game's data): This information is stored in the game's own database. Customisation can be made more powerful by using data from across the games company network, using data from all games. That information is typically stored in a database.

There are two different ways in which information may be used to support customisation:

Customisation on a game-specific basis—the server creates the user rankings based on their past behaviour in the game, and that determines which contacts the server sends to the client. The client would simply display the contacts selected.

Customisation on a game company network basis—user rankings would be created based on information taken from a database, covering all of their activity within the game company network. The rankings would be stored in a system, which would be updated at least on a daily basis, and would be available to all games using that framework. An individual game's servers would pull the rankings out of the system, and determine which users to send to the client. The client would simply display the users selected.

Testing and Optimisation

In one embodiment it is possible to use collected data regarding player behaviour to determine the effects that are produced by prioritising certain friends according to different criteria. This data can then be used to determine how the prioritisation of certain friends may be implemented most effectively.

For instance, the developer may be interested in determining which criteria, or combinations of criteria, are the best predictors of whether or not a player is likely to leave the game permanently. It may, for example, be found that using the time since last log-in as the only criteria provides the best prediction. On the other hand, the best prediction may be found by considering multiple criteria—such as levels completed, how long a player has been stuck on a particular level, etc.—and weighting them according to their predictive power. Collecting data on these different criteria and comparing them to data regarding players permanently leaving the game, will allow the developers to develop a means of best predicting which players that are likely to leave the game.

In another instance, the developer may be interested in determining the optimum values of different criteria for predicting how likely a player is to be reactivated if they are prioritised. For example, one player may not have played the game for 10 days, whereas another player may not have played the game for 20 days. The developer may wish to know which of these two players is more likely to respond to interaction from their contacts and to start playing the game again.

In another instance, the developer may be interested in determining to what extent prioritising friends in the selection lists that are judged to be likely to stop playing the game will improve player retention. For example, it may be that only displaying in the list those players that are judged as most likely to leave the game will maximise player retention by encouraging other players to interact with them. On the other hand, it may be that displaying in the list some players that are judged as most likely to leave the game and some that have been chosen at random from the full list of the players is more effective at retaining players in the long term.

For example, during a testing period two groups of players may be created. The first of these groups may be a control group in which all players are assigned an equal weight in their friend's selection list. I.e. players that are likely to churn are just as likely to appear in the list as players that are not likely to churn. The second group may be a test group in which the "likely to churn" players are assigned a higher weight in their friend's selection list. Taking the players that log in at least once during the test period to be reactivated, the effectiveness of the prioritising process can be analysed by comparing the proportion of reactivated players in the two groups.

To quantify the impact of the embodiments described above a number of factors can be assessed. These factors include (i) the number of players who return within a time period (e.g. 8-30 days) after they last logged in (reactivated players); (ii) the percentage of those reactivated players who returned by directly responding to a player's message, such as an invitation; and (iii) the number of requests sent to players who have not played within a time period (e.g. 8-30 days).

Using these factors it is possible to calculate the likely increase in requests received, and the likely conversion rate of requests received (reactivations).

In these ways, the process of prioritising certain friends may be optimised post launch.

Example Embodiment in a Game

The techniques described in this patent may be embodied in King.com's game Farm Heroes Saga™. It is, however, understood that the inventions described can be implemented in many different ways and it is not intended to be limited to only one game.

Figure 6:
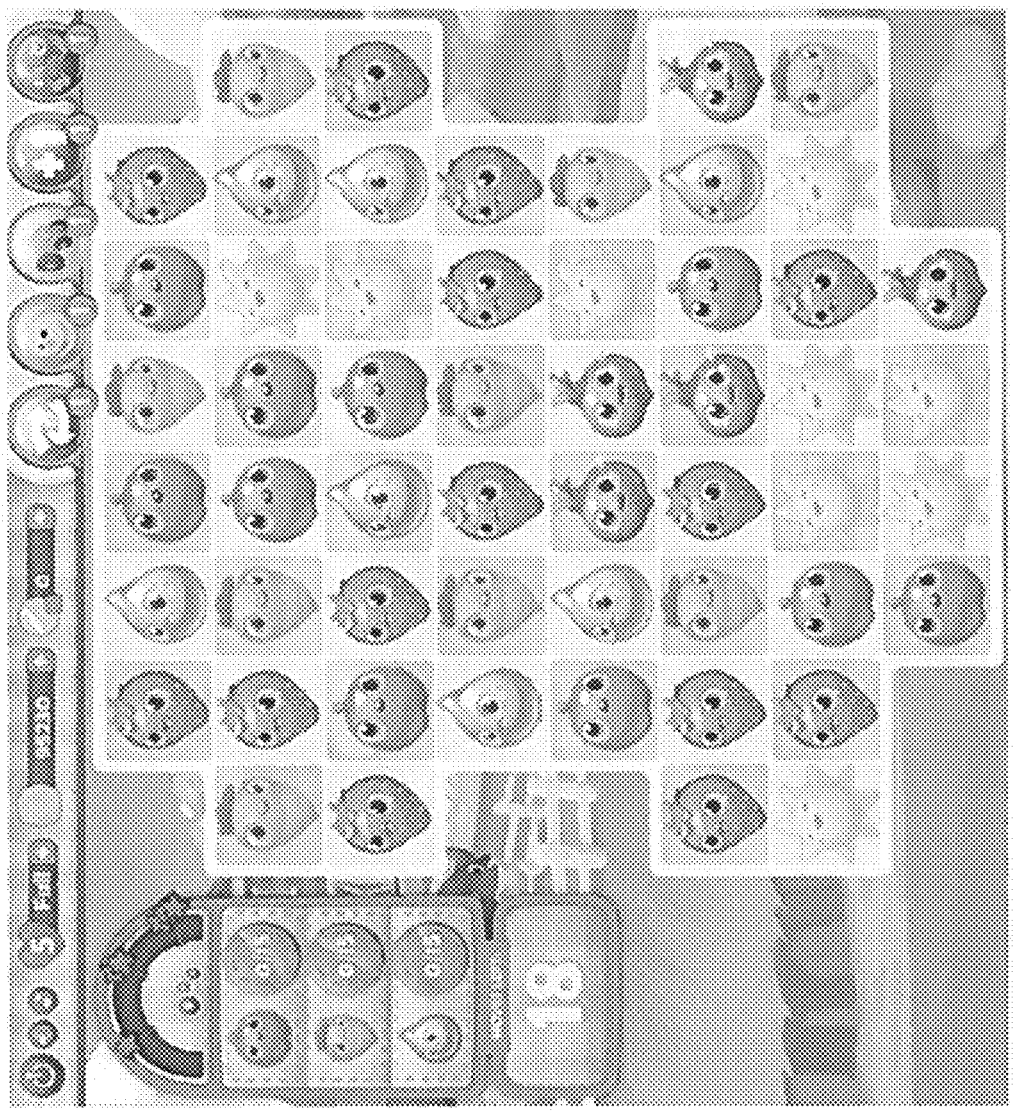
FIG. 6 shows an exemplary implementation of a game board.

The game described is a match-3 switcher game. The player is presented with the game board in a grid like shape with different types of game elements placed on each tile in the grid. An exemplary implementation of the game can be seen in FIG. 6 where the game board is implemented in a non-rectangular shape. It is understood by a person skilled in the art that the game board can be implemented with various layouts.

The game board is populated with different kinds of game elements, which may have different shapes and/or colours so as to be easily identifiable by the player. The number of different types of game elements that are used on a level may vary depending on the desired level of skill needed to complete the level. Some game board layouts may be easier with more or less types of game elements on the game board.

To play the game, game elements on the game board are swapped with each other to make moves on a game board. To gain points the player has to make moves that create matches of at least three of the same type of game element. In doing so, the player gains points and the matched game elements are removed from the game board. As a result, new game elements fall into place from the top of the game board in order to fill any empty spaces created.

The game may be implemented with different goals for different levels, which the player has to complete. One such goal is for the player to collect a defined number of a certain type of game element within a limited number of moves. The types of game elements to collect are for example shown to the left of the game board in FIG. 6.

Once all required game elements have been collected, the game will continue until the player is out of moves. The player is rewarded based on if he meets the goal of the level and also by the number of game elements over the goal that he has collected. The player can be rewarded with for instance a high score on the level. The reward can also be an in-game currency or reward that can be used to trade for some value in the game.

Game Modes

The game may be implemented with different game modes. The game modes may be used for one level as one goal or type of game or the game modes can be combined to give a different gaming experience.

One game mode has been described, to collect certain game elements. The user can, in an alternative game mode, be asked to indicate one of the types of game elements for which he will reach the level goal. The user can in some implementations be asked to wager on the fact that he will reach that target and a reward will be paid out in relation to that target game goal. The player may wager with in-game currency, such as a currency that he has purchased with real-world money. In some implementations the player may be able to wager with in-game currency that he has received for good gameplay and that he cannot exchange for real-world money.

The goal of collecting certain game elements can be implemented so that the player may not only have to collect standard game elements. Certain special game elements may be used on the game board and there are for instance different combinations of moves that the player has to achieve in order to activate, collect or use those game elements. We will below describe some different types of special game elements that can be implemented.

Figure 7B:
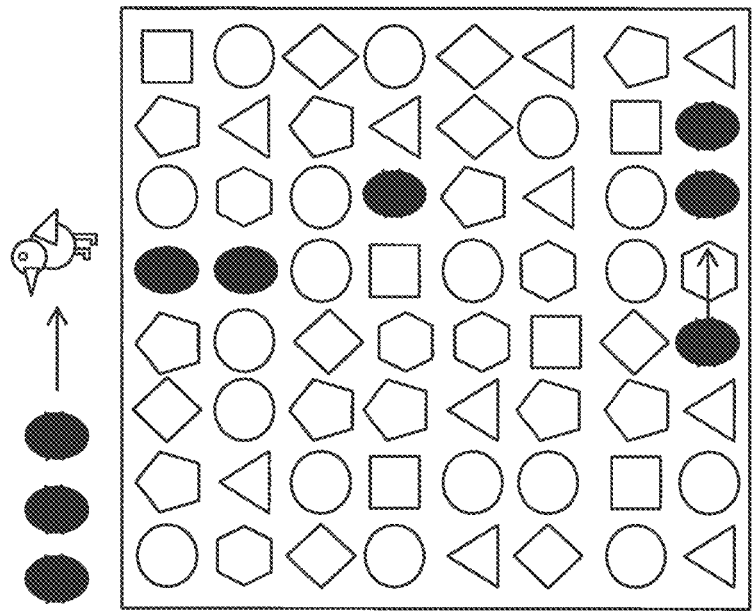
FIGS. 7A and 7B show game elements that need two matches to be removed.
Figure 7A:
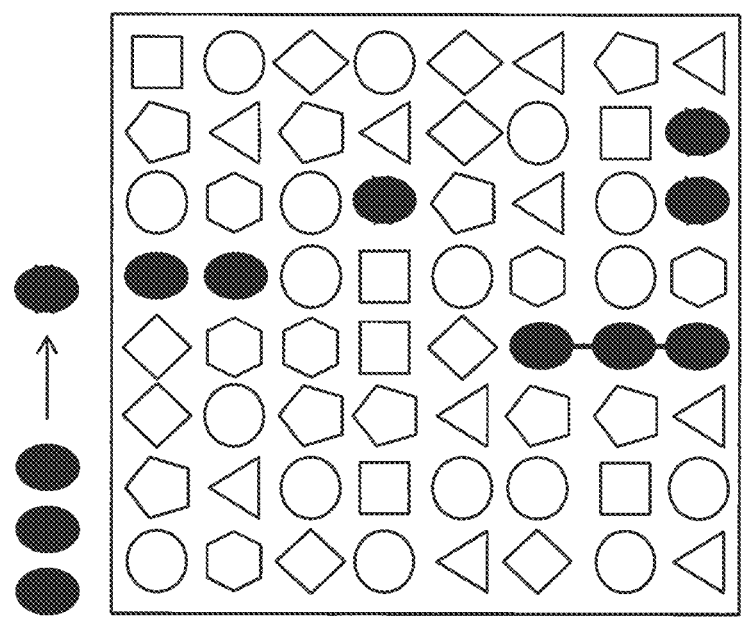

FIGS. 7A and 7B show a special game element that can be implemented for instance as eggs and chickens. These game elements need to be included in two combinations to be fully removed from the game board. The game element the player is supposed to collect is chickens, e.g. a hatched egg, but they are visible only as an egg in the game field. The first match of three 'eggs' results in that the three 'eggs' are replaced with a 'cracked egg', this is illustrated in FIG. 7A. The next time the new 'cracked egg' game element is included in a match of two or more 'cracked egg' elements it will reveal another element inside, which in one implementation is a 'chicken', this is illustrated in FIG. 7B. The chicken element does not remain on the game board but is removed and may be counted to the game goal of that level.

If the eggs are matched in a combination of 4 eggs then the cracked egg will be worth +1 if it would be collected. If the eggs are matched in a combination of 5 eggs then the cracked egg will be worth +2 if it would be collected.

Figure 8:
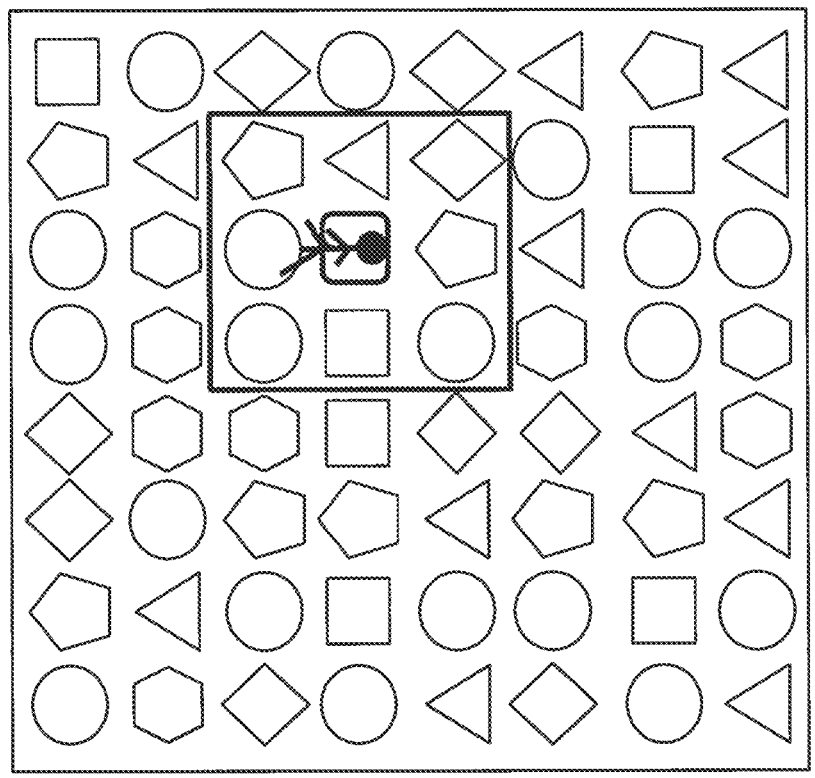
FIG. 8 shows the growing game element.

Another special game element is a 'growing game element' exemplified in FIG. 8. This game element may be one of the elements that should be collected to meet a goal on one level. The game element may in some implementations be static on the game board. For the player to collect the game element, the player needs to make a number of matches of game elements adjacent to the growing game element. The game element may for instance require four matches next to it to be collected. In some implementations this growing game element can be implemented as a crop or flower that changes appearance depending on the number of matches that have been made next to it.

An alternative implementation of the growing game element requires the player to make a match in all the 8 spaces surrounding the growing game element (or less if places next to for instance an edge or a rock). As soon as the player has made a match in all spaces, the growing game element grows and 1 unit is collected. The game element may be implemented to indicate which of the tiles surrounding it have been included in a match, so that the player does not have to remember which tiles he should include in a match in order to collect from the growing game element.

Figure 9:
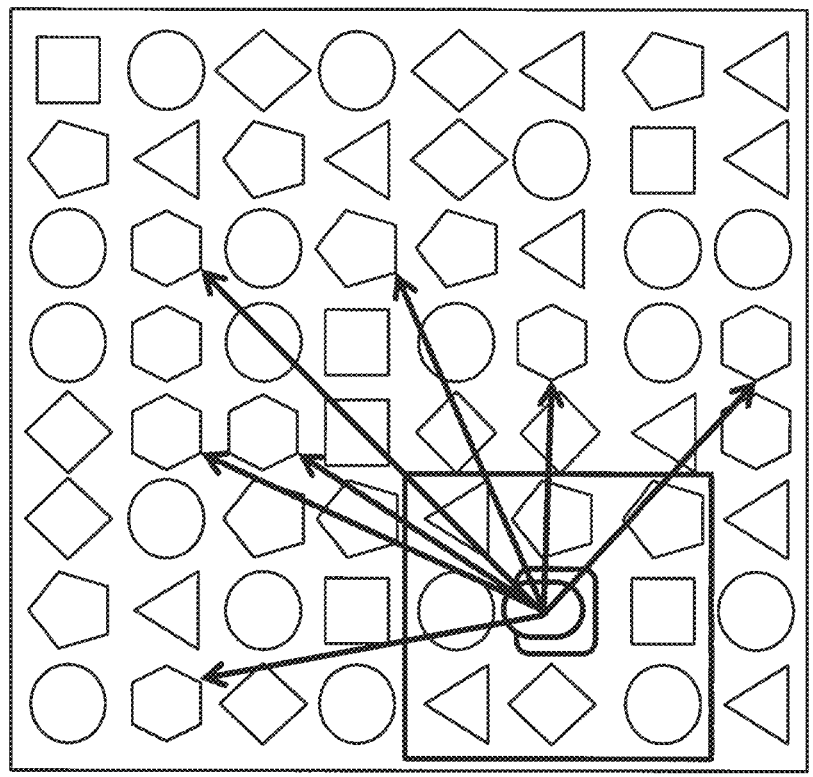
FIG. 9 shows the water sprout game element.

Yet another special game element is exemplified in in FIG. 9. In one implementation this special game element can be in the form of a water sprout. The water sprout may, in one implementation, be activated once a player has made a match in all the 8 spaces surrounding the growing game element (or less if places next to for instance an edge or a rock). When all the spaces have been used, the sprout will spurt out a number of 'water' game elements that replace a set of random normal objects in the field. The water game elements are standard collectibles, but they are not part of the objects that fall in from the top of the screen in this mode. The added water game elements will be introduced with a +1 value on the game board. This added value will deplete, as for regular game elements.

The game may be implemented so that for each match of three or more game elements on the game board, each of the adjacent game elements that do not form part of the match will get +1 in value if they are collected from the game board. So in the game modes where the player is required to collect certain game elements from the game board a regular game element counts as 1. A game element with +1 point/value counts as 2 collected game elements and +2 counts as 3 collected game elements and so on. Every turn, however, all elements with an added value will lose one value or in some implementations they will go back to be valued only as one element. In some instances one move/switch of game elements may create several matches and the some game elements may therefore get more then +1 in value at any given time. There may also be bonus modes where certain game elements get upgraded with +1 or another value.

Figure 10:
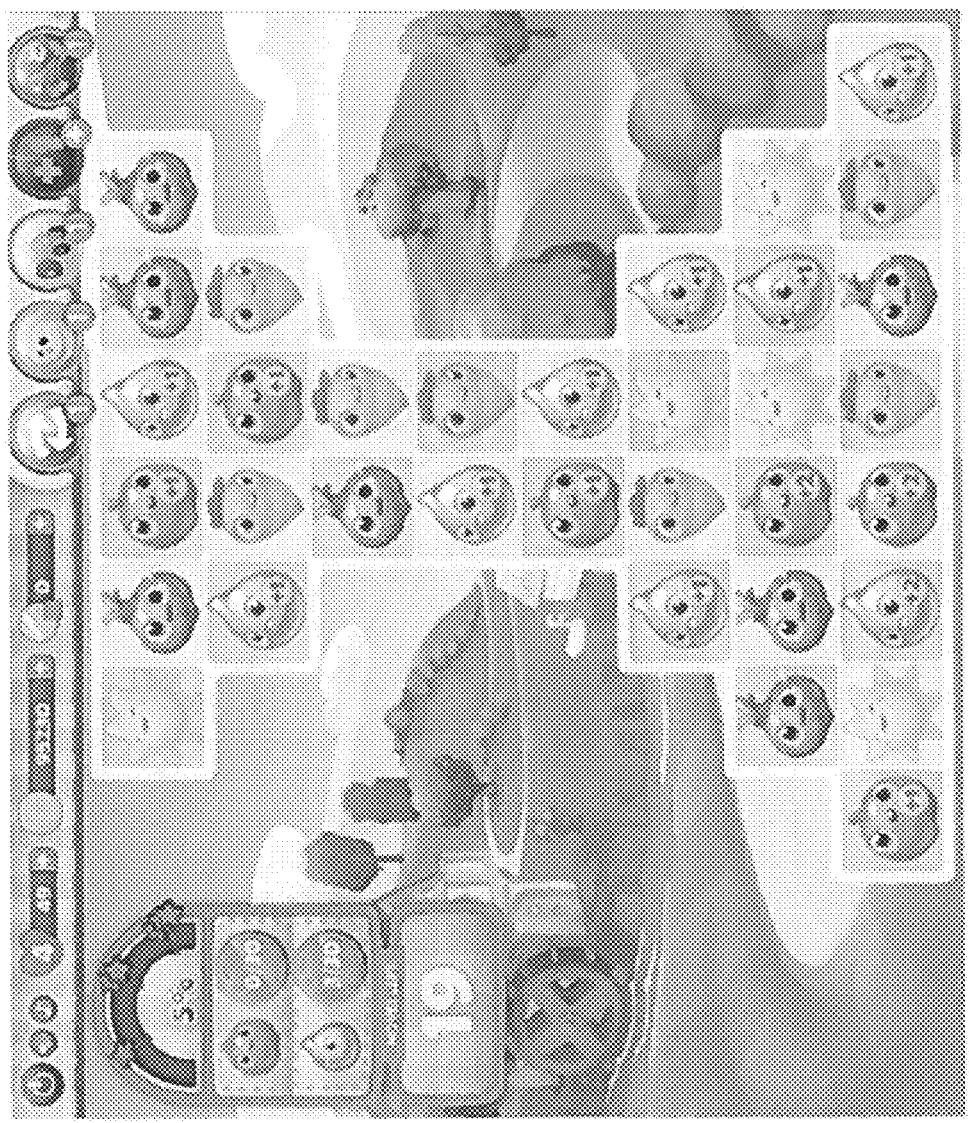
FIG. 10 shows the +1 mechanic.

The +1 value may be revealed for the player for instance when he hovers the mouse pointer over that game element. It may, in another implementation, be represented as a number within a circle superimposed over the game element on the game board, as shown in FIG. 10. If the number is constantly shown in relation to the game element this will help the player to evaluate the value of available moves.

Collection Levels

Figure 11:
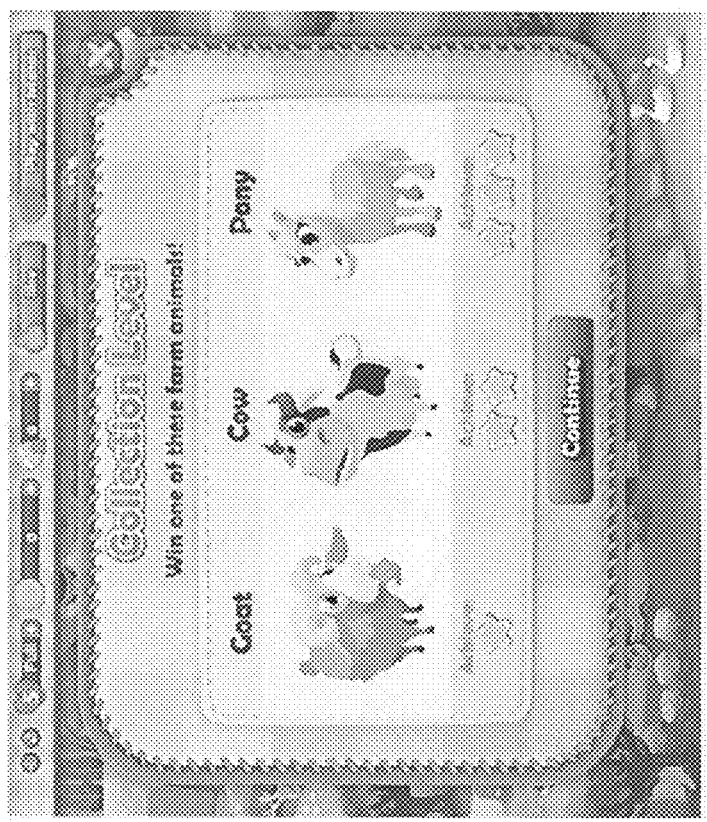
FIG. 11 shows an example of animals that the user can collect.

There may be additional features in some levels that enhance the gameplay or other aspects such as retention and monetization. One such feature is 'Collection levels' which play out in a similar way to normal levels with the addition of the option to collect cute animals such as the ones shown in FIG. 11.

Figure 12:
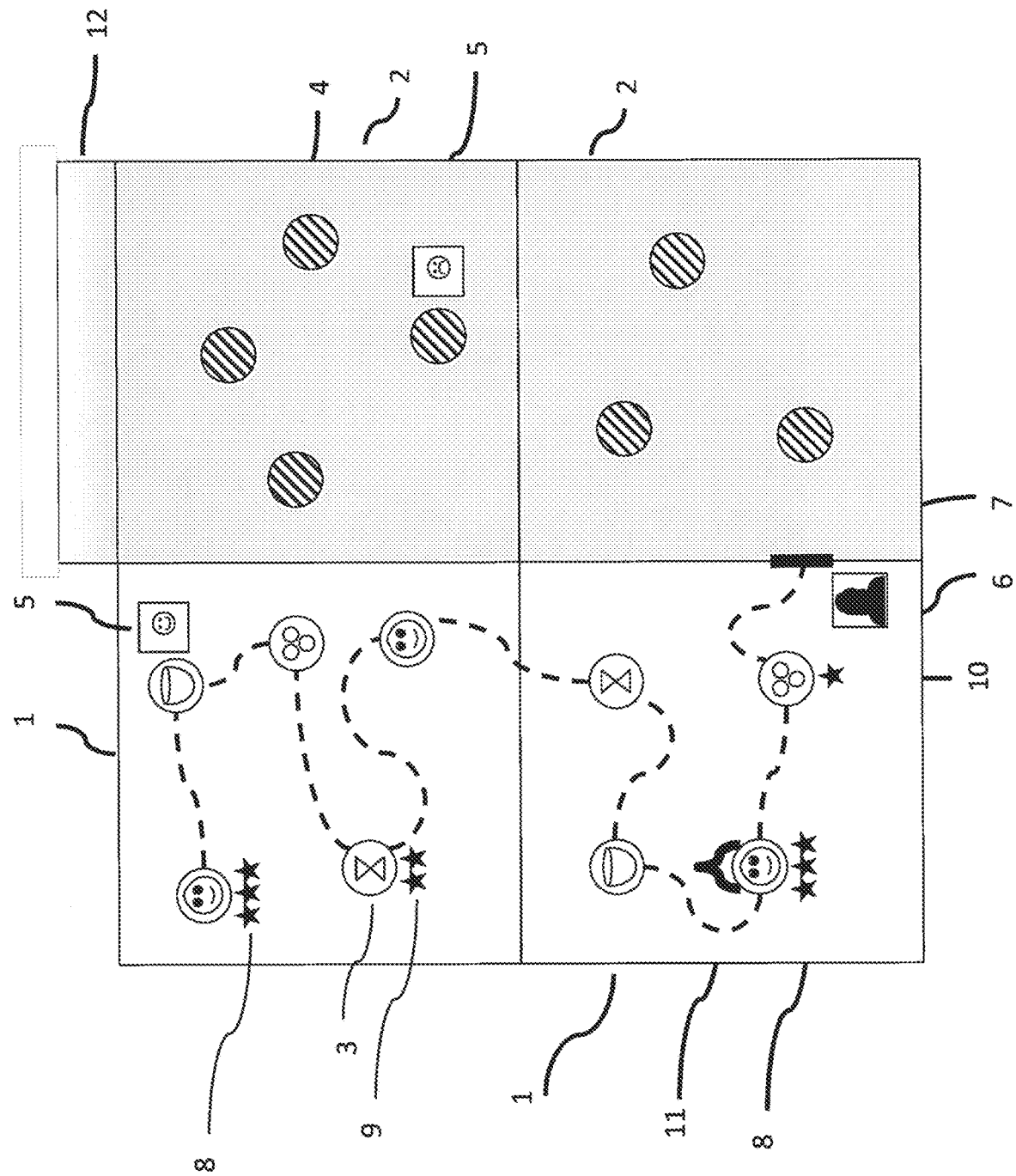
FIG. 12 shows an implementation of a virtual map.

The collection levels may be spread out over the levels the players can play in the game. In the type of implementation shown in FIG. 12 there may be a collection level per 'episode' or 'chapter' in the game. The collection levels may be indicated with, for instance, a different game node on the map. In each collection level there are three animals that may be collected depending on how well the player does on the level. The higher the score, the more animals will be collected. The number of animals collected may be tied to other reward systems for the levels, such as the number of stars the player earns for that level.

Figure 13:
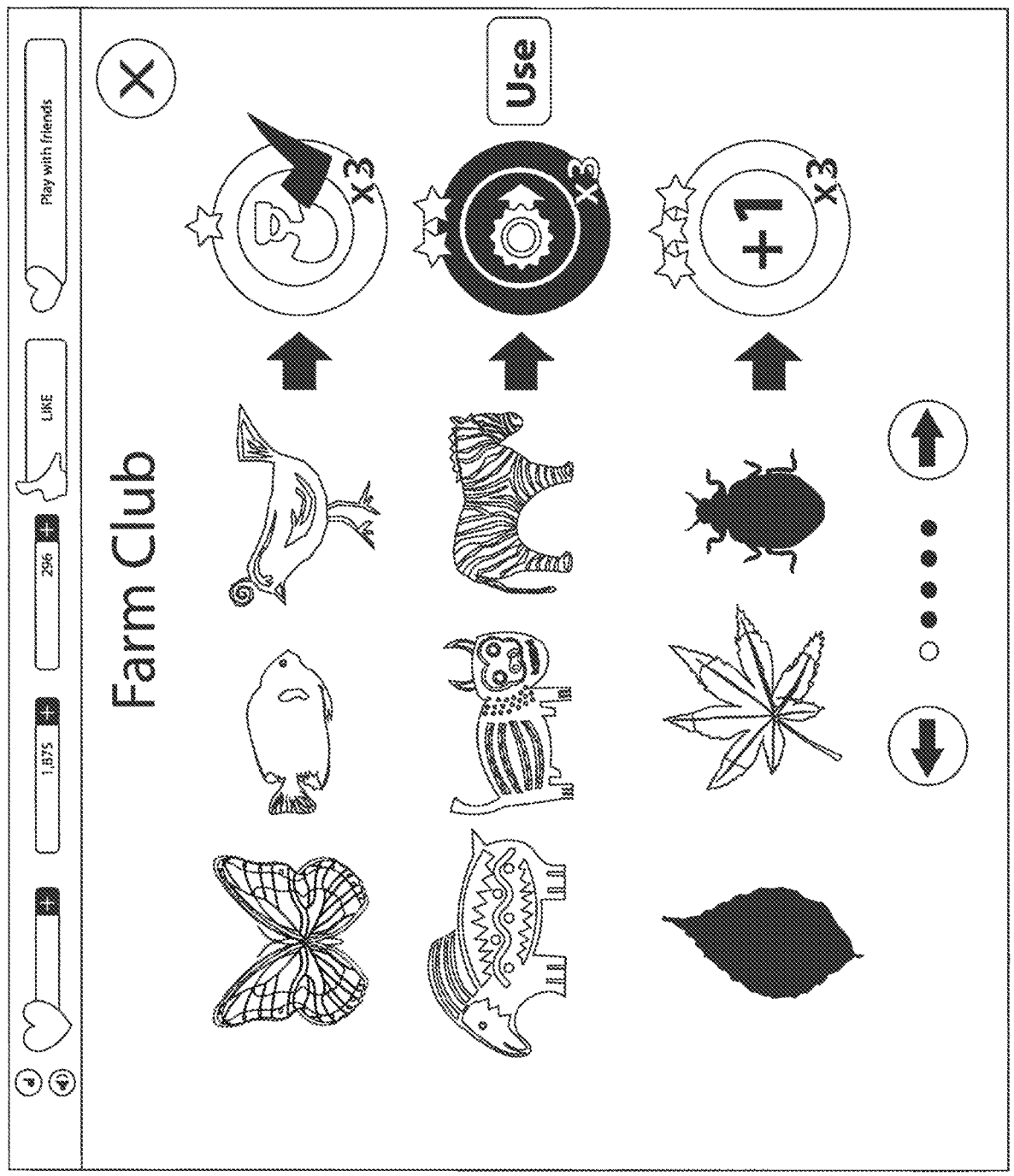
FIG. 13 shows a table of collected animals.

The player can access a table where the collected animals are shown. FIG. 13 shows an exemplary implementation of where the collected animals can be shown. In the shown implementations the collected/unlocked animals count towards a reward, in this case one or several free boosters. Different implementations may require different number of animals to unlock the boosters.

Boss Levels

Figure 14:
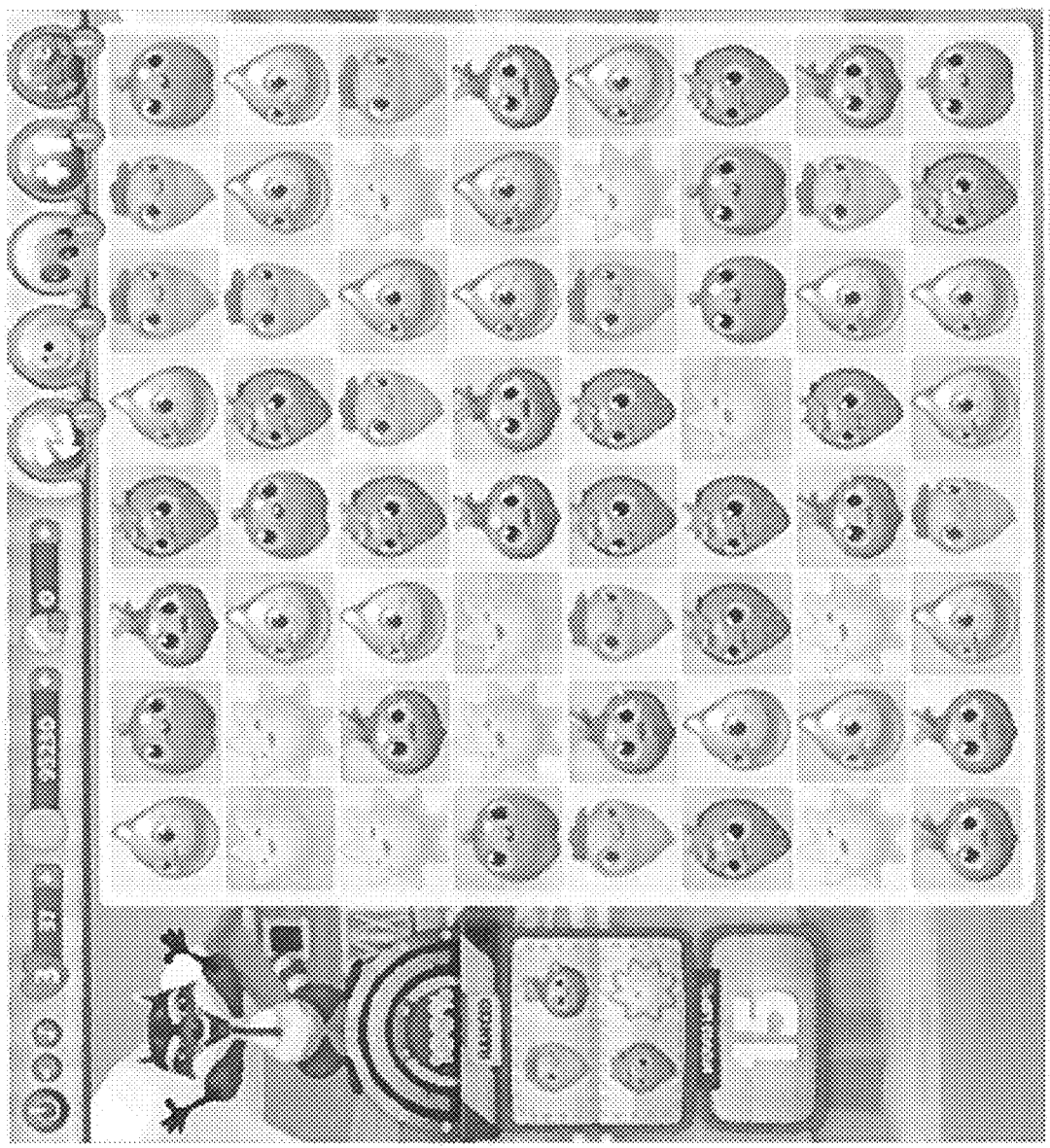
FIG. 14 shows a boss level.

The game can be implemented with certain levels where the player has to defeat a character in the game. The levels may be similar to regular levels with the added challenge of defeating a character by collecting a certain amount of all or some of the available game elements. The game may be implemented so that the boss' health is represented with an arched meter such as the one shown in FIG. 14. The standard Growth Bar may be replaced with a Health Bar that the player must reduce to zero. The player will typically be presented with which of the game elements that will count against defeating the boss. It may, however, not be disclosed how many game elements need to be collected in order to defeat the boss and complete the level, although the total 'damage' made to the boss may be shown.

Figure 15:
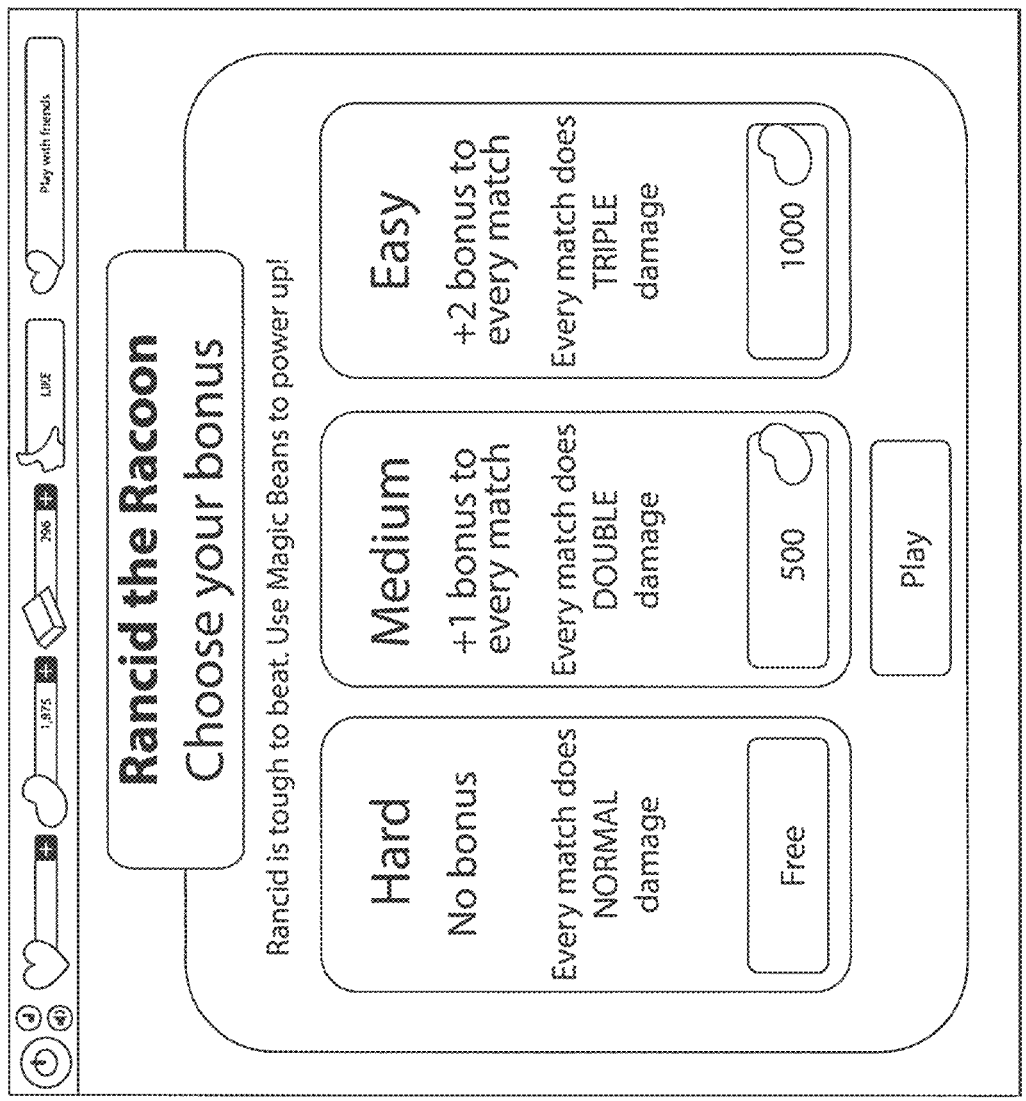
FIG. 15 shows a boss level option screen.

Before the level starts, the player is presented with the option to pay to make more damage to the boss and thus have a higher likelihood of completing the level. In one implementation the options given may be as shown in FIG. 15, where the player can choose to play the level for free, to pay to give +1 in damage for each game element or +2 for each collected game element. These power-ups increase the number of objects that the player collects every time he makes a match, making it easier to pass the level. The currency used to pay with can be in-game currency or real money where the player then can pay with for instance a credit card. In another implementation the player may also pay to give double or triple damage, also illustrated in FIG. 15.

In some implementations the currency used to buy extra damage for a boss level is received from good gameplay in other levels. In the present implementation this currency is in the form of 'beans', which the player receives based on the score received in one level. The player may also top up with more 'beans', paying for it with real world money or using a virtual currency.

Game Elements ('Cropsies')

These are the game elements on the game board itself, a collection of strawberries, carrots, onions, suns, water drops, and apples. The game elements may be matched in groups of three or more.

Collectable Objects Egg

Eggs live on the game board much like normal game elements, but they're harder to crack. Once they are cracked, however, a small chick flies out, ready to be collected. When eggs are on the board, one of the collection targets may be chicks. When the players match three eggs, they don't all disappear. Instead, one of the eggs remains and becomes cracked.

Once three cracked eggs are matched, they all zoom together and are destroyed, then a chick flies out and is collected. Eggs need to have two states: whole and cracked. The hatching animation is of a chick emerging from broken shell. Then; the chick flying towards the resource collection area.

Matching 4, 5 or T/L shapes doesn't change what happens to the eggs: They still form together to make a single cracked egg. Combo matches do, however, act identically to normal game elements when it comes to the rest of the effects: Matching 4 will still add +2 to every other required game element adjacent to the matched eggs. Matching T/L will still cause +1's along a row and a column. Matching 5 will still cause +2's to be sent out to 5 random game elements. Unlike normal game elements; eggs don't glow white when these combos occur.

Grower

This is a static object that must have matches made around it to grow. Once it's fully grown, it becomes a collected object.

The grower object acts as a static blocker: not affected by gravity etc. When the players make a match that's adjacent to the grower, it grows one stage. After making X matches (where X is either a pre-set number of defined in the editor), the grower is considered 'grown'. At this point it is removed from the game board, and the grown object flies towards the left-hand resource collection area, where there are: Static idle frames in various states of growth, growing animations and the 'grown' animation: The grown object itself flies towards the resource collection area, while the parts remaining on the game board should dissolve/fade away.

Fount

A fount is a single square on the game board that houses a collection of one game element types.

Unleashing this fount causes those game elements to scatter across the board. This will most often be the only way to get that type of game element. The fount object acts as a static blocker: not affected by gravity etc. When the players make a match that is adjacent to the fount, it loses a 'life'. After three adjacent matches have been made, 6 lots of water burst outwards and land on random squares on the game board (replacing current normal game elements).

Water must not burst out in such a way that makes an automatic match. To try: Fount instantly regenerates itself to full lives once it's been burst.

A static object on the board needs to show a type of game element that is lying underneath. It could be a bubble-like object—it needs to give the impression that it's about to burst, in any case. Idle animation should have the game elements moving around inside, like they're trying to get out. For this there may be a 'Burst' animation.

Blockers

Blocker: Flowers

Flowers are both a blocker and a new collectable object. They work in the following way: They are static on the board; other objects fall around them. If the players make a match adjacent to the flower, it will grow one stage. After the flower has grown three stages, it leaves the game board and flies to the collection area on the left of the screen.

Blocker: Eggs

Like flowers, eggs are also both a blocker and a different object to collect:

Eggs can be moved and matched just like a regular object. However, once matched, they form together into one cracked egg. The players must then match three cracked eggs to create one chick, which leaves the game board and flies to the collection area. Cracked and non-cracked eggs cannot be matched together.

Blocker: Bubbles

Bubbles store up a certain number of one object types inside of them. If the players make an adjacent match next to a bubble, it pops. When it pops, a certain number of one object types, say, apples, fly out and land on the game board. These objects can then be matched as normal, and the bubble disappears.

Blocker: Pollution Cloud

Static blocked space—not susceptible to gravity; objects fall around it. Adjacent matches make it disappear. It is a squarish shape with rounded corners. It has a dark cloud of pollution—possibly with angry face. It pulses/writhes/bubbles when idle. It expands quickly and dissolves into tiny clouds that evaporate: If it has a face, it should look shocked.

Blocker: Ice

This is a static space—not susceptible to gravity; objects fall around it. It houses a random game element inside. The player can involve that game element in a match to destroy the ice and the game element. They are square blocks of semi-transparent ice. A frozen game element has a shocked look on its face. This shatters and fades away when matched.

Blocker: Grass

Players can move objects around on a collection target and it's possible to collect more than the players actually need.

The players must grow grass on certain tiles in order to achieve a collection target. In a grass level, certain tiles of the game board have patches of bare earth on them. One or more of these patches is a tile of already-grown grass. Game elements move freely on top of these two tile types. When a match is made adjacent to the grass, that grass grows into the tiles of the match the players just made. So, if the player makes a vertical match of three game elements to the right of some grass, then those three tiles would also turn into grass. They would need a certain amount of grass tiles to achieve the collection target. There could be more patches of earth than is needed to allow the players to over-achieve.

Other blockers may be implemented in the game to create a more challenging game play and interesting experience for the players.

The game may be implemented with different game field shapes and there may be various constraints implemented into the game board. Such constraints may, for instance, be 'Muddy objects' which cannot be switched, but a match next to will uncover them and reveal, for instance a regular game element.

Another blocker element is the 'crow' element. These game elements need to be matched and collected in a certain number of moves or they will reset the specific collectible counter.

Another blocker element is the 'mole' element. These game elements dig around and cause objects to become muddy and un-switchable. Switch next to the mole to knock it out for a number of rounds, for instance 5 rounds.

Another blocker element is the 'hail storm' element. The hails cause collectible objects to be valued at −1 for the next move.

Boosters

There is a plurality of boosters in the game that are unlocked as the players play and unlock further levels.

The boosters in the game may be implemented with a time mechanic. When the players activate a booster, it becomes inactive for a particular period of time. When that time is finished, the booster can be used again. The earliest booster might take 20 minutes to recharge, while the most powerful might take 72 hours.

The player can also click on a booster that's not yet ready, and pay some currency to hurry it up. Boosters may be bought both pre-level and during the game.

Shovel: Destroys a Selected Element

Tractor: Click on the booster then click on any row; all objects on that row are destroyed, and all required objects are added to the player's total +1 Giver: All required objects are given a +1 bonus Colour Collect: Click on the booster, then click on any object; Hunter the dog will come and collect all objects of that type.

Further Implementations

Oil Slick sits underneath objects: Not susceptible to gravity. Match on top of oil to get rid of it. Any game element on top of oil gets a −1 anti-bonus. As soon as a game element moves out of the oil, it loses the −1. Its appearance is a squarish patch of dark, bubbly oil. Any game element on top of oil looks sad and sick. Disappearing animation: dissolves into the ground when a match is made on top of it.

Bad Game elements: Evil game elements drop onto the game board and must be avoided! There are six evil versions of the six basic game elements: one for each colour. They act and get matched just the same as normal game elements. Good suns match with bad suns, and so on. The difference: these evil game elements carry a permanent −1. Alternative implementation may be that instead of −1, the Bad Game elements could simply nullify any match made that they're involved in. So if the players need strawberries, but make a match that involves a Bad Strawberry, then none of the strawberries in that match count towards the player's total.

Frequency rules: Bad Game elements should be less frequent than normal game elements, which means we would need to implement some kind of probability setting for when they appear. Alternatively; in the editor, adding Bad Game elements is done with a single tick box. The game then treats them as a single game element type when it comes to generating them. Thus if I had five out of six game elements selected in the editor, as well as the Bad Game elements, that would count as six types in total. The game would then recognise which game elements were required collection targets, and only generate Bad versions of those game elements.

Travelling Pollution Cloud

A nasty, though small, cloud of pollution that moves around the board every turn, making game elements sick. The cloud sits behind game elements, which can travel freely over it. At the start of every turn, once the game board is idle, it makes all game elements sitting on top get a −1. When the players make a match, it temporarily disappears/becomes inactive. When the board is idle once more, it reappears in a random place on the board and gives game elements on top of it a −1. This could be the size of a single tile, or that of four tiles.

Gopher/Mole

A mischievous animal who likes to grab game elements and pull them underground. At the start of every turn, when the game board is idle, the gopher pops up on a random tile and consumes the game element there. He then sits on that tile. After the players make a match, he disappears underground for a turn, leaving behind an empty space that game elements will then fill. After another match is made, the mole pops up again and repeats this process. If the players make a match adjacent to the gopher, while he is above ground, he is stunned for three turns.

The invention claimed is:

1. A computer server configured to generate user behaviour data comprising:
   a network interface for receiving user inputs from a plurality of computer devices connected via a communication network to the server, during interaction with a game displayed on each computer device;
   computer storage configured to store the user inputs and a plurality of contact identifiers of contacts of the user of a first computer device of the plurality of computer devices, each contact being a user of the other of the computer devices for the user of the first computer device to interact with;
   a processor configured to generate user behaviour data based on the user inputs by identifying the progress of a user in the game to indicate for each user the likelihood of that user leaving the game wherein less progress indicates a greater likelihood of the user leaving the game;

wherein the processor is configured to prioritize for display from the plurality of contact identifiers a set of the contact identifiers to be displayed at the first computer device, the set including at least a subset of the users of the other computer devices that are determined to be the most likely to leave the game;

transmit the prioritized set of the contact identifiers to the first computer device for display at the first computer device, the prioritized set including the subset of users that are determined to be most likely to leave game; and cause the prioritized set to be displayed on a display at the first computer device.

2. The computer server according to claim 1 wherein each contact identifier is associated with a selectable icon for allowing a user of the first computer devices to interact with at least one of the contacts of the prioritized set, thereby encouraging interaction by the user of the computer device with his contacts determined as most likely to leave the game.

3. The computer server according to claim 1, wherein the selected set of contact identifiers is transmitted in a message to be conveyed over the communication network from the computer device to first computer device.

4. The computer server according to claim 3 wherein the message comprises a customised pop-up for display at the first computer device.

5. The computer server according to claim 3 wherein the message comprises priority rankings for each of the subset of contact identifiers, the contact identifiers to be displayed in order of the priority ranking.

6. The computer server according to claim 1 wherein the processor is configured to cause the prioritized set to be displayed on a display at the first computer device.

7. A computer implemented method implemented at a server, the method comprising at the server:

receiving user inputs from a plurality of computer devices, connected via a communication network to the server, during interaction with a game rendered on the display of each computer device, storing the user inputs in computer storage and generating user behaviour data based on the user inputs by identifying progress of a user in the game to indicate for each user the likelihood of that user leaving the game wherein less progress indicates a greater likelihood of the user leaving the game;

accessing computer storage holding a plurality of contact identifiers of contacts of each of the users;

transmitting to one or more of the computer devices for display at said one or more computer device a prioritized set of the contact identifiers wherein at least a subset of users of the prioritized set corresponds to the contacts of the user that are determined to be the most likely to leave the game; and causing the prioritized set of contact identifiers to be displayed on the display of the one or more computer device.

8. The method according to claim 7, wherein each contact identifier is associated with a selectable icon for allowing the user of each one or more computer device to interact with at least one of the contacts of the prioritized set thereby encouraging interaction by the user of each one or more computer device with his contacts.

9. The method according to claim 7, wherein only a capped subset of the set of contact identifiers correspond to the users most likely to leave the game and a remainder of the prioritized set is selected at random from a priority ranked list of users.

10. The method according to claim 7, comprising causing the user behaviour data to be held locally at a user device of the user.

11. The method according to claim 7 further comprising monitoring the effect of displaying the contact identifiers by determining which contacts leave the game.

12. The method according to claim 7 wherein the step of prioritizing comprises ranking contacts in the order in which they are most likely to leave the game, and the step of causing the prioritised set of contact identifiers to be displayed comprises displaying the contact identifiers in the order of the priority ranking.

13. The method according to claim 7 wherein the step of causing the prioritised set of contact identifiers to be displayed comprises customising a pop-up for transmission and display at the one or more computer device.

14. The method of claim 7, comprising allowing the user of the first computer device to interact with at least one of the contacts of the prioritized set by transmitting an invitation or in-game gift.

\* \* \* \* \*